United States Patent
Yadav et al.

(10) Patent No.: US 11,232,492 B2
(45) Date of Patent: Jan. 25, 2022

(54) COMPUTER GRAPHICAL USER INTERFACE FOR OPTION PLANNING

(71) Applicant: SAP SE, Walldorf (DE)

(72) Inventors: Rahul Yadav, Chandler, AZ (US); Jacob Stovall, Chandler, AZ (US); Mandar Sahani, Chandler, AZ (US)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 16/517,457

(22) Filed: Jul. 19, 2019

(65) Prior Publication Data

US 2020/0342504 A1 Oct. 29, 2020

Related U.S. Application Data

(60) Provisional application No. 62/838,767, filed on Apr. 25, 2019.

(51) Int. Cl.
*G06Q 10/06* (2012.01)
*G06Q 30/02* (2012.01)
*G06F 3/0482* (2013.01)
*G06F 9/451* (2018.01)

(52) U.S. Cl.
CPC ....... *G06Q 30/0283* (2013.01); *G06F 3/0482* (2013.01); *G06F 9/451* (2018.02)

(58) Field of Classification Search
CPC ................................ G06Q 10/06; G06Q 30/02
USPC ...................................................... 705/7.35
See application file for complete search history.

(56) References Cited

U.S. PATENT DOCUMENTS

| | | | | |
|---|---|---|---|---|
| 2002/0161664 | A1* | 10/2002 | Shaya | G06Q 30/0254 |
| | | | | 705/7.31 |
| 2016/0019625 | A1* | 1/2016 | Parpia | G06Q 30/0631 |
| | | | | 705/26.7 |
| 2016/0063065 | A1* | 3/2016 | Khatri | G06Q 30/02 |
| | | | | 707/723 |
| 2016/0189177 | A1* | 6/2016 | Parpia | G06Q 30/0202 |
| | | | | 705/7.31 |
| 2016/0292703 | A1* | 10/2016 | Kolluru | G06Q 10/067 |
| 2018/0060892 | A1* | 3/2018 | White | G06Q 30/0205 |

* cited by examiner

*Primary Examiner* — Nga B Nguyen
(74) *Attorney, Agent, or Firm* — Klarquist Sparkman, LLP

(57) ABSTRACT

Technologies are described for performing automated option planning. For example, option planning can comprise displaying a plurality of product segments, displaying historical performance for the plurality of product segments (e.g., indicating how many options were offered previously), receiving a change threshold value, automatically calculating an option count range for each product segment based at least in part on the change threshold value and the historical performance, automatically determining a proposed option count for each product segment (e.g., limited to its corresponding option count range), and displaying the proposed option count for each of the plurality of product segments. Sales targets can also be calculated and displayed based on the proposed option counts. Option planning can be performed within a graphical user interface.

20 Claims, 7 Drawing Sheets

COMPUTER GRAPHICAL USER INTERFACE FOR OPTION PLANNING

CROSS REFERENCE TO RELATED APPLICATION

This application claims the benefit of U.S. Provisional Application No. 62/838,767, filed Apr. 25, 2019, entitled "OPTION PLANNING WITH VISUAL PROPOSAL GENERATION," which application is incorporated herein by reference in its entirety for all purposes.

BACKGROUND

Retailers typically determine the types of products that will be sold in their stores in advance (e.g., a number of months or years in advance). For example, a typical retailer may plan the product choices or the types of products to be included in their product assortment a few months or years in advance of determining the actual products (the actual assortment plan) that will be used. There are several decisions that the retailer needs to make during this process. The decisions include the number of choices or types of products to sell, the grade of products to provide, and what brands, style, color, and size to include in the assortment. These decisions may need to be made in the context of a region (e.g., a geographical area) as well as the target customer audience.

When determining the types of products to include in their product assortments, retailers typically rely on a manual process that includes reviewing their product categories and determining which aspects of the products influence sales in a given region. The situation is further complicated when dealing with products that tend to change over time (e.g., in the fashion industry), which makes historical analysis difficult. For example, a product planner dealing with retail fashion products may have to utilize simple rules of brand, style, or color to determine the types of product choices to select for the product assortment. Using such rules of thumb can lead to poor decisions (e.g., decisions that are not optimal or that are not based on historical data). Retailers also have difficulty with organizing sales data to gain insights and run projections of which product choices align with a given goal (e.g., a profit or revenue goal).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for performing option planning. For example, option planning can comprise displaying a plurality of product segments, displaying historical performance for the plurality of product segments (e.g., indicating how many options were offered previously), receiving a change threshold value, automatically calculating an option count range for each product segment based at least in part on the change threshold value and the historical performance, automatically determining a proposed option count for each product segment (e.g., limited to its corresponding option count range), and displaying the proposed option count for each of the plurality of product segments. Sales targets can also be calculated and displayed based on the proposed option counts. Option planning can be performed within a graphical user interface.

For example, methods can be provided for performing option planning using a graphical user interface. The method comprises displaying a plurality of product segments to a user via a graphical user interface, displaying, to the user via the graphical user interface, historical performance for each of the plurality of product segments, where the historical performance indicates how many options were offered previously within each of the plurality of product segments, and receiving, from the user via a graphical user interface element of the graphical user interface, a change threshold value. The method further comprises automatically calculating an option count range for each product segment based at least in part on the change threshold value and the historical performance. The method further comprises automatically determining a proposed option count for each product segment, where each proposed option count is limited to its corresponding option count range, and where the proposed option counts are automatically determined to maximize at least one performance indicator across the plurality of product segments for a new planning period. The method further comprises displaying, via the graphical user interface, the proposed option count for each of the plurality of product segments.

DETAILED DESCRIPTION

Overview

Figure 1:
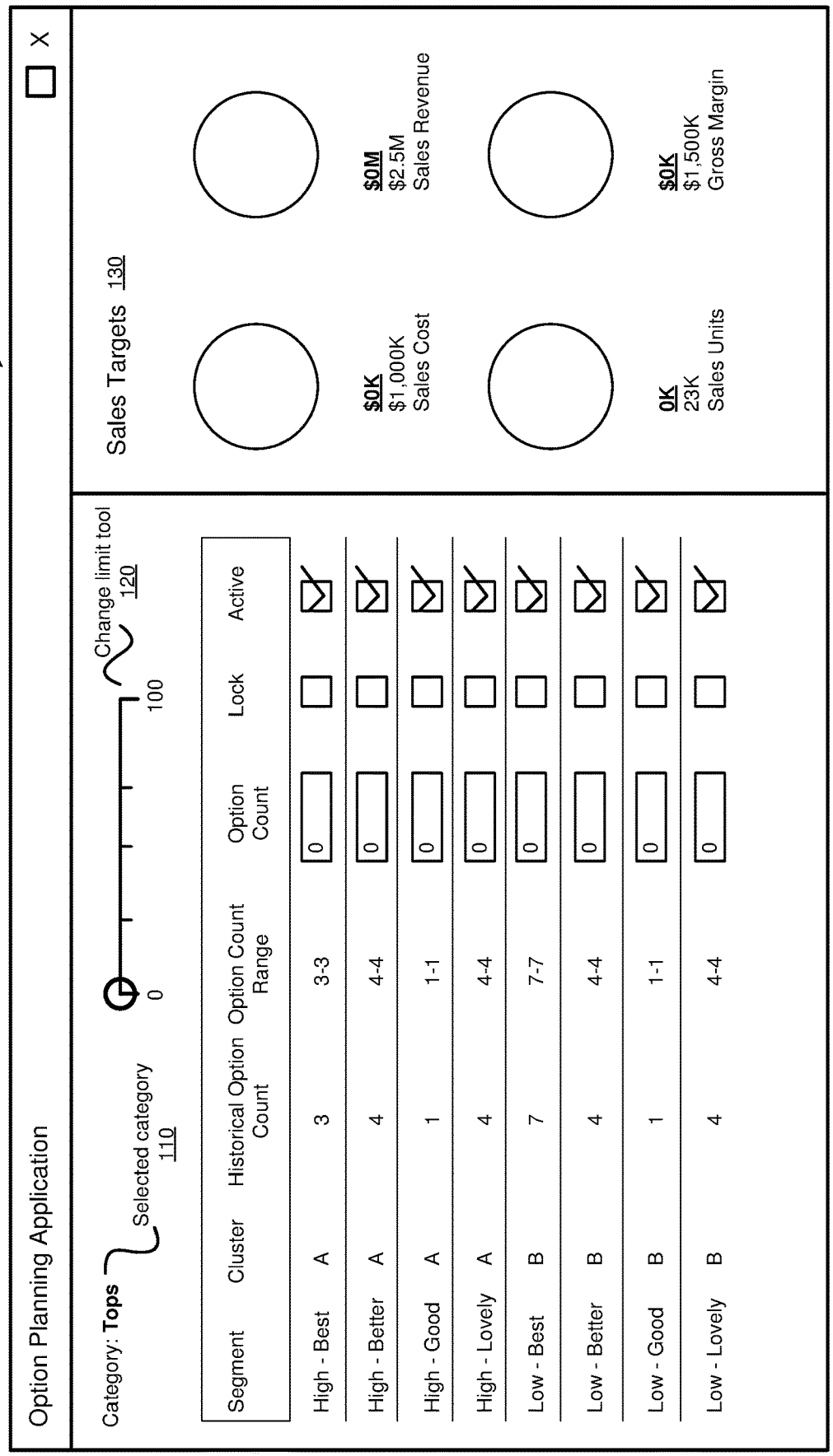
FIG. 1 is a diagram depicting an example option planning user interface for determining option counts.

The following description is directed to technologies for performing option planning. For example, option planning can comprise displaying a plurality of product segments, displaying historical performance for the plurality of product segments (e.g., indicating how many options were offered previously), receiving a change threshold value, automatically calculating an option count range for each product segment, automatically determining a proposed option count for each product segment for a new planning period, and displaying the proposed option count for each of the plurality of product segments. Sales targets can also be displayed based on the proposed option counts. Option planning can be performed within a graphical user interface.

In previous option planning solutions, the process of determining option counts was a manual process. For example, a planner would have to manually determine option counts and manually evaluate the effect of the option counts on various performance metrics. Such a manual process suffers from a number of drawbacks. For example, the planner may not be able to analyze the effect of change option counts across a number of products. The planner may also not have the ability to effectively analyze the historical data.

The graphical user interface-based option planning technologies described herein provide a number of advantages. For example, a planner can obtain an automated proposal of option counts for a category with just a single selection of a user interface element (e.g., a single interaction with the slider). The automated proposal of option counts can also be performed with cluster level granularity. This interaction using a single user interface element is more efficient and effective. For example, the planner can select a change threshold value using the single user interface element and the application can automatically evaluate option counts within a range that is automatically determined based on the change threshold value. The application can automatically determine proposed option count values that optimize (e.g., maximize) various performance indicators while still adhering to specific constraints (e.g., budget). This visual and automated procedure is more efficient in terms of interface interaction (e.g., the user needs to make fewer user interface selections) and computing resource utilization (e.g., instead of running multiple simulations to try to determine optimal option counts, the application can take the single input and model the solution as a single task). This solution frees up the planner to focus on more valuable higher-level decisions, such as analyzing projected sales performance.

The technologies described herein also enable the planner to minimize redundant work. For example, categories can be analyzed by region to identify low performing options, and the choices can then be adjusted to address this issue. This approach incorporates actionable intelligence in the option planning process, allowing planners (e.g., retailers) to optimize the category strategy at the regional level to maximize high performance choices while decreasing the focus on non-performing product choices and minimizing manual work.

Option Planning

Option planning refers to the selection of products (called product options or product choices) that will be sold by an organization (e.g., a business, such as a retailer). Option planning can be part of an overall retail planning process. The retail planning process can begin with a merchandise plan, which specifies the fiscal goals at a product category level. Location clustering can be employed to cluster sales locations (e.g., retail stores) into groups (e.g., by geographical area). Option planning can then be performed to identify product options. The process can continue with assortment planning (e.g., using the option planning results to determine the assortment of products), product listing and allocation, and finally product sales. The planning solutions can use historical sales data to help with analysis for the plan period. Depending on the business, the planning process can start a few years before the products appear in the store.

In some option planning solutions, a planner plans the product choices for each category by location cluster. Location clusters are based on the sales characteristics of one or more categories and are created by the planner. The planner further analyzes the sales trends for each cluster, category, and product choice to determine the kinds of products to keep for the plan period. These product choices are referred to as product options. Option planning provides a flexible means of defining product options by category, giving the planner a tool to refine and analyze sales trends by product options and location clusters.

One of the challenges faced by a planner is that the actual products change over time. For example, in the fashion industry, the actual products being sold change from season to season, and few products are carried across seasons. This makes historical analysis at the product level difficult. Trends can be summarized at the category level. For example, a planner can determine if the Men's Shirt category is performing between seasons and across years, but that does not always provide the necessary resolution for decision making (e.g., which specific brands, colors, styles, sizes, etc. to include in the product assortment).

The option planning process can address this issue by providing attribute-based option definition and analysis by category. The planner can then analyze the Men's Shirt category by the brand attribute while also analyzing the TV category by the resolution attribute. Such attributes that can then be used to define the option or choice for a category are referred to as option defining attributes in the option planning process. The planner can also control the way the option choice counts are computed. This is controlled by aggregation at the attribute level. For example, using an aggregation attribute of color for the category Men's Shirt with an option defining attribute of brand indicates that for each brand the planner wants to count the number of colors in the option planning process. In other words, for this example option planning is performed across brands by varying the number of colors. For example, a Men's Shirt category could include two brands, a first clothing manufacture and a second clothing manufacturer. The first clothing manufacturer could have two shirt colors, such as red and blue. The second clothing manufacturer could have three shirt colors, such as black, white, and red. In this example, the first clothing manufacturer would have an option count of two (two distinct shirt colors) and the second clothing manufacturer would have an option count of three (three distinct shirt colors). Option planning at this level does not typically reach the product level (e.g., specific products or SKUs, which in this example could be a specific shirt defined by size, color, brand, etc.).

An option plan can be created based on the selected categories and attributes. Location clusters can also be created based on sales analysis. The clusters can provide the regional context of the option plan. An option plan can then be created for the plan period and the categories and regions for planning can be identified. The planner can identify the options that are to be considered for the plan period for each category.

Prior to option planning, the sales strategy for a category can be determined and communicated in the merchandise plan by selecting performance indicators, such as sales revenue, sales cost, gross margin, sales units, etc. The planner can use the performance indicators to align the category options with the strategic objectives. For example, the strategy can be to maximize profits or maximize revenue for a certain category in a region. The planner can add or remove products (e.g., add or remove segments) or modify option counts. For example, increasing the number of choices for a better selling brand in a given region may increase revenue but could negatively impact profit. The planner needs to reconcile the effect on these interrelated performance indicators to align the strategy by region for each category.

Automated Option Planning Using a Graphical User Interface

FIG. 1 is a diagram depicting an example option planning user interface 100 for determining option counts. For example, the example option planning user interface 100 can be used by a planner to automatically optimize sales goals (e.g., performance indicators such as sales revenue, sales units, gross margin, etc.) and product assortment (e.g., the number of product options for each segment and across a number of clusters) while taking into account one or more constraints (e.g., a fixed sales cost or budget). Using the example option planning user interface 100, the planner can run projections (also called what-if scenarios) to determine the effect on the sales goals and metrics when the number of product options are allowed to vary (e.g., within a system-defined or user-defined range) for the product segments. In some implementations, option planning is performed for each of a plurality of clusters. A cluster represents a group of stores that have similar characteristics (e.g., that are in the same region or geographical area, that carry similar types of products, etc.). For example, a first cluster could represent stores in one state or area of the country, a second cluster could represent stores in a different state or a different area of the country, and so on. For example, the planner can optimize sales goals for a number of product options for each segment and across a number of clusters.

The example scenario depicted in the example option planning user interface 100 is related to a planner in the fashion industry that is performing option planning for a number of categories (e.g., shirts, pants, shoes, etc.). Using the user interface, the planner can determine the number of product options (also referred to as product choices) to provide for each of the product types, also called segments. A segment refers to a specific type of product with specific attribute values for one or more attributes. For example, for a men's shirt category that is defined by size and color attributes, one segment could be men's shirts that are large and blue, another segment could be men's shirts that are medium and blue, another segment could be men's shirts that are large and red, and so on. A category of products can be organized into segments based on the values of one attribute or based on the values of multiple attributes (e.g., containing some or all permutations of the values of the multiple attributes).

In the scenario depicted in the example option planning user interface 100, the user has selected two attributes (as option defining attributes) for the tops category (selected at 110). The two selected attributes are price band and product grade. The price band attribute has attribute values of low and high, with a value of low indicating a relatively low priced product and a value of high indicating a relatively high priced product. The product grade attribute indicates a relative quality of the product, from lowest grade "lovely" to highest grade "best."

Depicted in the example option planning user interface 100 are four product segments in a first cluster (cluster "A") and four product segments in a second cluster (cluster "B"). Each segment is defined by the price brand attribute and the product grade attribute. For example, the first segment in cluster A has a price brand attribute value of high and a product grade attribute value of best.

Historical option counts are provided for each of the product segments. The historical option counts (also referred to as the reference option count) represent the number of product choices (e.g., specific products or SKUs, which in this example could be a specific shirt defined by size, color, brand, etc.) that were offered previously (e.g., in the last season, last year, or some other historical timeframe). Historical option counts can be determined from historical sales data.

Option count ranges are listed. In this example implementation, the option count ranges are initially limited to the corresponding historical option counts. For example, if the historical option count is 3, then then option count is initially set between 3 and 3 (i.e., the initial option count range is the same as the historical option count value).

Depicted in the example option planning user interface 100 is a change limit tool 120. The change limit tool 120 is a graphical user interface element that allows the user to provide a change threshold value. The change threshold value indicates how much the option count range can deviate from the historical option count. For example, if the user sets the change threshold value to 25%, then the option count range can deviate 25% (plus or minus) from the historical option count. As a specific example, if the historical option count is 3, then the option count range would be 2-4 if the change threshold value is set to 25%. The calculation can be performed by multiplying 3 by 0.25 and setting the option count range to plus and minus the result (in this case, 3+0.75=4 (rounded to nearest whole number), and 3−0.75=2 (rounded to nearest whole number)).

Depicted in the example option planning user interface 100 is an area displaying sales targets 130. The sales targets area 130 includes a sales cost user interface element that indicates a sales budget (e.g., a maximum amount that can be spent), which can be used as a constraint when automatically determining proposed option counts. The sales targets area 130 also includes a sales revenue user interface element that indicates projected sales revenue based on the current option count values. The sales targets area 130 also includes a sales units user interface element that indicates projected sales units (the number of units projected to be sold) based on the current option count values. The sales targets area 130 also includes a gross margin user interface element that indicates projected gross margin based on the current option count values. As depicted, each of the sales targets includes a current value in bold that is based on the current option count values (e.g., the current sales cost is $0K as an initial value). Each of the sales targets also includes target (e.g., goal) value. For example, the target sales cost is $1,000K, the target sales revenue is 2,5M, the target sales units is 23K, and the target gross margin is $1,500K.

The example option planning user interface 100 depicted in FIG. 1 is in an initial (e.g., default) state. In the initial state, the change limit tool 120 is initially set at 0%, the proposed option counts are zero, and the sales targets are zero. This is just one example of an initial state of the user interface, and other initial states could be used. For example, the option counts could be set to the historical option counts and the sales targets 130 could display corresponding values based on the historical option counts.

Figure 2:
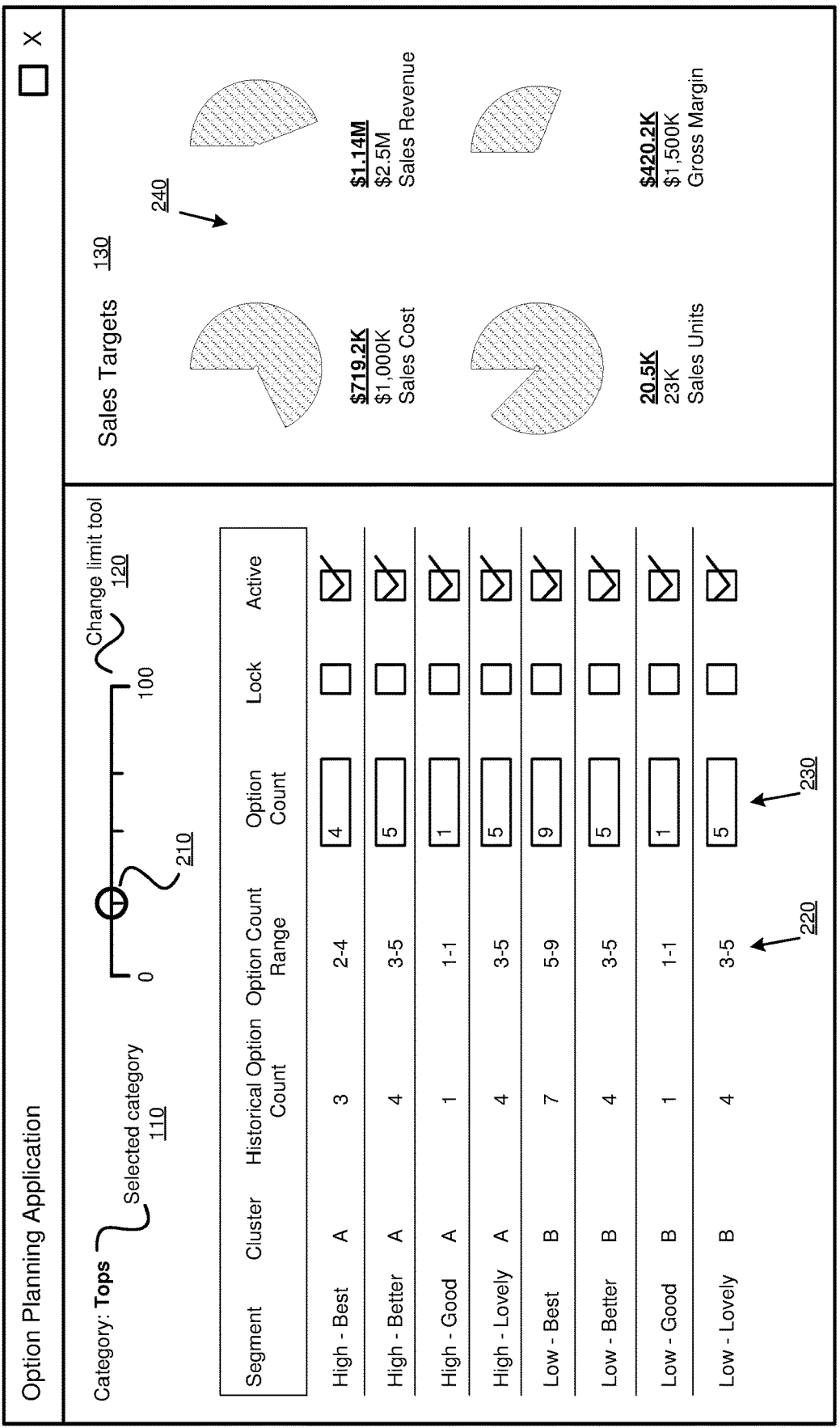
FIG. 2 is a diagram depicting the example option planning user interface with option count ranges and sales targets based on a 25% change threshold value.

FIG. 2 is a diagram depicting the example option planning user interface 100 with option count ranges and sales targets based on a 25% change threshold. Specifically, in FIG. 2, the user has used the change limit tool 120 to select a change threshold value of 25%, as depicted at 210. Based on the change threshold value of 25%, the application has automatically calculated the option count ranges, depicted at 220, based on the historical option counts. For example, the option count range for the high-best segment in cluster A has been calculated to be 2 to 4, based on the historical option count value of 3, the option count range for the high-better segment in cluster A has been calculated to be 3 to 5, based on the historical option count value of 4, and so on.

Based on the automatically calculated option count ranges, depicted at 220, the application then automatically determines proposed option counts, depicted at 230. The proposed option counts are automatically determined by the application to maximize the desired performance indicator (in this scenario, to maximize gross margin) while not exceeding the sales cost budget (in this scenario, $1,000K) and while staying within the option count ranges depicted at 220. For example, the application uses a linear programming model to determine which combination of values maximizes the desired performance indicator (or indicators) within the given constraints.

In an example implementation, the proposed option counts are automatically determined using the following linear programming model. The linear programming model uses the following variables:

$o$ represent an option and $O = \{1, , , o\}$ set of all options $c$ represents a cluster and $C = \{1, , , c\}$ set of all clusters $n_{oc}$ is the option-cluster combination $$\forall o \in O, c \in C : n_{oc} = \begin{cases} N_{oc}, \text{ planned option count per option - cluster combination i.e. } n_{oc} \\ R_{oc}, \text{ reference option count per option - cluster combination i.e. } n_{oc} \\ P_{oc}, \text{ purchase price per option in each cluster. So, } N_{oc} * P_{oc} \text{ is overall cost for option - cluster} \\ S_{oc}, \text{ sales revenue per option and cluster. So, } N_{oc} * S_{oc} \text{ is overall sales for option - cluster} \end{cases}$$

$v$ represents the variance in percentage by which an option count can vary for a planning period {v, % variation by which option count can vary± for planning period}

In the example implementation of the linear programming model, boundaries are defined as follows:

Option count variance for each Option/Cluster combination:

$$\forall n_{oc} : R_{oc} - R_{oc} * v \leq N_{oc} \leq R_{oc} + R_{oc} * v$$

Approved cost for category:

b is the total budget (e.g., sales cost) for all options in a category $$\forall n_{oc}: \sum_{\substack{o \in O \\ c \in C}} N_{oc} * P_{oc} \leq b$$

In the example implementation of the linear programming model, the objective of the linear programming model is to maximize the gross margin for a category without violating the constraints, as follows:

$$\forall n_{oc}: \sum_{\substack{o \in O \\ c \in C}} N_{oc} * S_{oc}$$

Using the automatically determined proposed option counts (e.g., and applying the above example linear programming implementation), the application calculates the corresponding sales targets, depicted at 240. Specifically, in this scenario, using the proposed option counts, depicted at 230, the sales cost would be $719,200 (which is under the budget of $1,000,000), the sales revenue would be $1.14 million, the number of units sold would be 20,500, and the gross margin would be $420,000.

The example scenario depicted in FIG. 2 has a goal of optimizing option counts for the segments in order to maximize gross margin while staying within the sales cost budget. However, other scenarios can be performed using different constraints and/or goals. For example, one or more other performance indicators could be maximized (e.g., sales units, gross margin, etc.).

Figure 3:
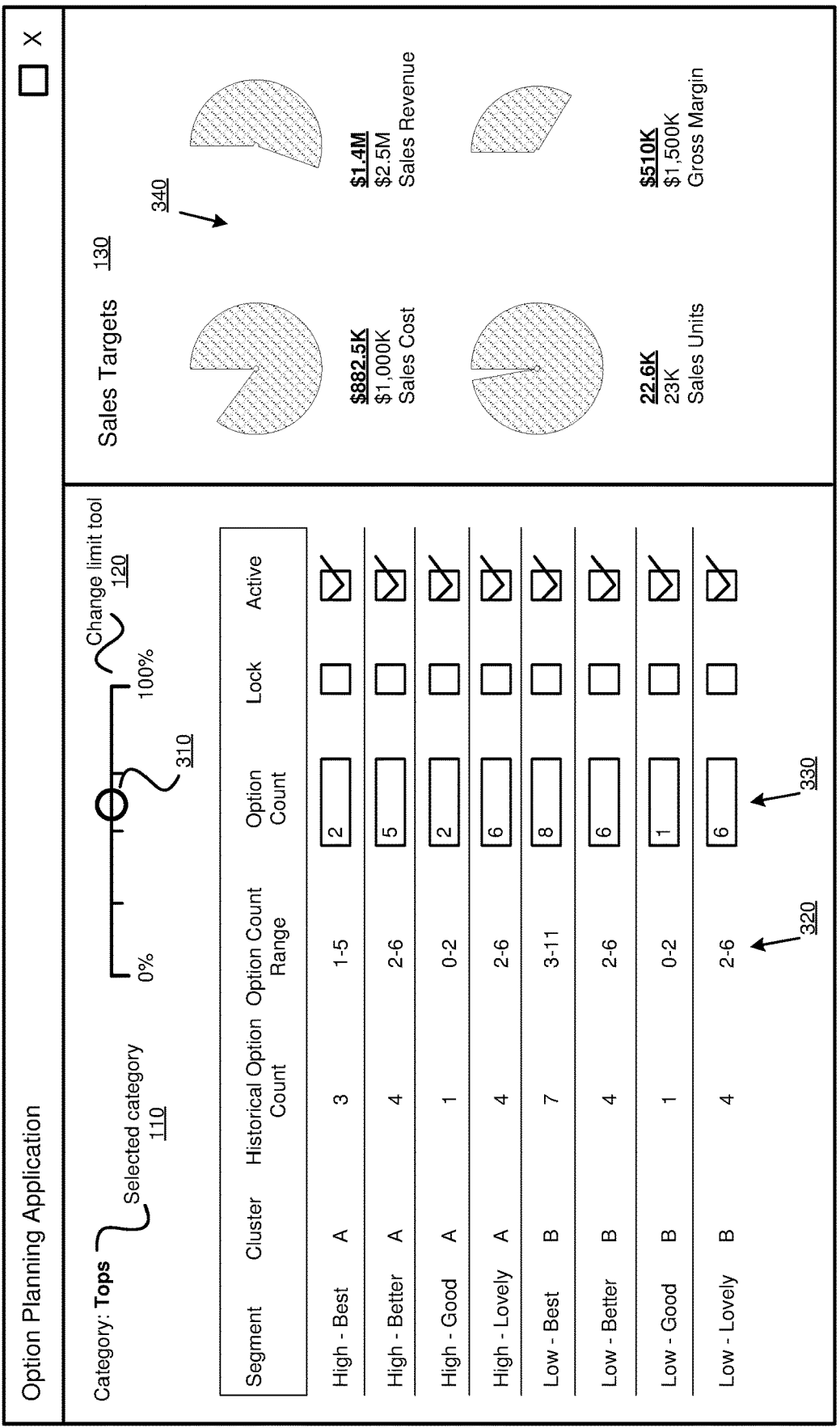
FIG. 3 is a diagram depicting the example option planning user interface with option count ranges and sales targets based on a 60% change threshold value.

FIG. 3 is a diagram depicting the example option planning user interface 100 with option count ranges and sales targets based on a 60% change threshold. Specifically, in FIG. 3, the user has used the change limit tool 120 to select a change threshold value of 60%, as depicted at 310. Based on the change threshold value of 60%, the application has automatically calculated the option count ranges, depicted at 320, based on the historical option counts. For example, the option count range for the high-best segment in cluster A has been calculated to be 1 to 5, based on the historical option count value of 3, the option count range for the high-better segment in cluster A has been calculated to be 2 to 6, based on the historical option count value of 4, and so on.

Based on the automatically calculated option count ranges, depicted at 320, the application then automatically determines proposed option counts, depicted at 330. The proposed option counts are automatically determined by the application to maximize the desired performance indicator (in this scenario, to maximize sales revenue) while not exceeding the sales cost budget (in this scenario, 1,000K) and while staying within the option count ranges depicted at 320. For example, the application uses a linear programming model, or a different approach, to determine which combination of values maximizes the desired performance indicator (or indicators) within the given constraints.

Using the automatically determined proposed option counts, the application calculates the corresponding sales targets, depicted at 340. Specifically, in this scenario, using the proposed option counts, depicted at 330, the sales cost would be $882,500 (which is under the budget of $1,000,000), the sales revenue would be $1.4 million, the number of units sold would be 22,600, and the gross margin would be $510,000. In relation to the sales targets depicted at 240 (using the 25% change threshold), the sales targets depicted at 340 (using the 60% change threshold) are higher. For example, the sales revenue increases from $1.14 million to $1.4 million.

As depicted in these examples, the planner can quickly and efficiently determine the mix of product options that maximizes one or more performance indicators while not deviating more than a specified amount from the number of product options offered previously. For example, the planner can select a specific change threshold value and view how the category would perform if option counts are allowed to vary according to the specific change threshold value. In addition, the planner can quickly and efficiently determine the mix of product options with cluster level granularity (e.g., across any number of clusters).

In some implementations, the user can modify the proposed option counts. For example, the user can use the change limit tool 120 to select a change threshold value and the application can automatically determine the proposed option counts. The user can then edit one or more of the proposed option counts (e.g., change an option count for a segment to a different value within the option count range or outside the option count range) to view how the change would affect the sales targets (e.g., the sales targets displayed in the sales targets area 130 can be automatically updated to reflect the edited option count or edited option counts).

In some implementations, the user can override other constraints. For example, the user could override the sales cost constraint (e.g., increase it to 1,200K). In response, the application can re-calculate the sales targets displayed in the sales targets area 130 based on the overridden sales cost.

Figure 4:
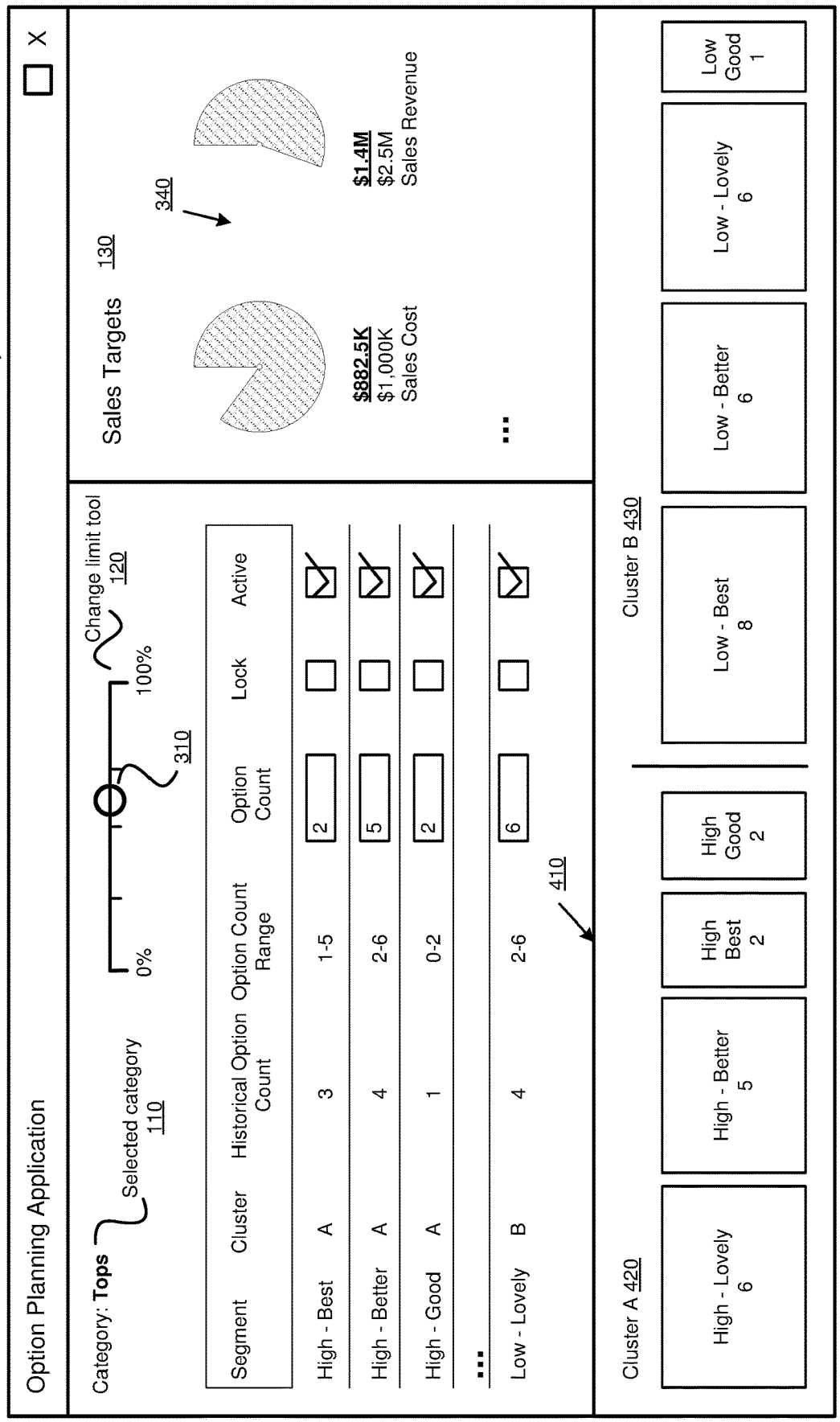
FIG. 4 is a diagram depicting the example option planning user interface with an optional additional user interface area.

FIG. 4 is a diagram depicting the example option planning user interface 100 with an additional user interface area 410. The additional user interface area 410 is an optional user interface area that visually depicts the distribution of proposed option counts by cluster using a heat map. Other visual depiction techniques can be used to depict the relative values of the proposed option counts in addition to, or instead of, a heat map.

In the additional user interface area 410, the option count boxes for the segments of cluster A are depicted at 420 and the option count boxes for the segments of cluster B are depicted at 430. In addition, the option count boxes for each cluster are sized according to their respective option count values (in this example, the respective option count values are those depicted at 330). For example, the box representing the high-lovely segment for cluster A, which has an option count value of 6, is larger than the high-better segment for cluster A, which has an option count value of 5. The boxes can also be color coded to indicate their relative option count values. The additional user interface area 410 also illustrates how option counts can be different between clusters. Specifically, in this example, the automatically determined option counts for cluster A, depicted at 420, are different from the automatically determined option counts for cluster B, depicted at 430. For example, the application can automatically determine optimal option counts (e.g., to maximize various performance indicators) across a number of clusters (e.g., with cluster level granularity).

Methods for Performing Option Planning Using a Graphical User Interface

In the technologies described herein, methods can be provided for performing option planning using a graphical user interface. For example, as part of the option planning process, the graphical user interface can display a plurality of product segments (e.g., defined by one or more attribute values). The user interface can display historical performance (e.g., historical option counts) for the product segments. The user can control the amount of variation allowed for a new planning period by selecting a change threshold value (e.g., using a graphical user interface element, such as a slider or entry field to enter a value such as a percentage). Using the change threshold value and the historical performance, option count ranges can be automatically calculated for each product segment. Proposed option counts can be automatically determined for each product segment from the option count ranges. For example, the proposed option counts can be determined to maximize one or more performance indicators.

Figure 5:
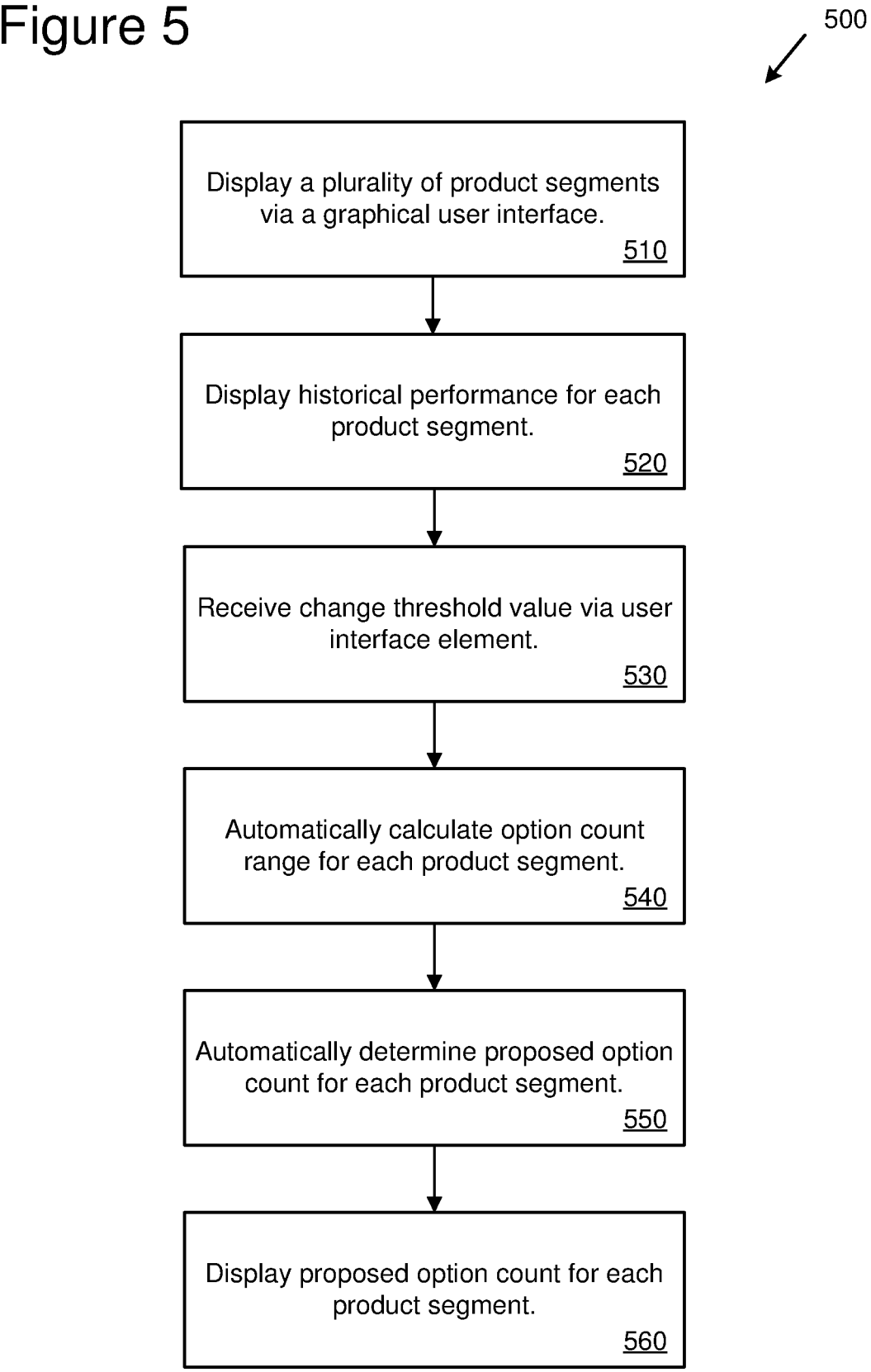
FIG. 5 is a flowchart of an example method for performing option planning using a graphical user interface.

FIG. 5 is a flowchart of an example method 500 for performing option planning using a graphical user interface. The example method 500 can be performed by software running on one or more computing devices. For example, the example method 500 can be performed by an option planning application (e.g., running as a cloud service), such as the option planning application depicted in FIGS. 1-4.

At 510, a plurality of product segments are displayed to a user via a graphical user interface. In some implementations, the user first selects a product category from a plurality of available product categories. For example, the user can be presented with a plurality of product categories, such as tops (e.g., shirts) and bottoms (e.g., pants). The plurality of product segments are associated with the selected product category.

At 520, historical performance for each product is displayed via the graphical user interface. In some implementations, the historical performance is displayed as historical option counts. For example, a historical option count value can be displayed for each product segment indicating how many product options were provided for the product segment during a historical period (e.g., a previous month or year).

At 530, a change threshold value is received from a user via a user interface element of the graphical user interface. In some implementations, the change threshold value is received as a percentage value. However, the change threshold value can also be received using a different representation that can be used to calculate a variation to the historical performance, such as a fraction. In some implementations, the change threshold value is received via a slider graphical user interface element (e.g., via the change limit tool 120). However, the change threshold value can also be received using a different user interface element, such as an entry field, a selection from pre-defined values, etc.

At 540, an option count range is automatically calculated for each product segment based at least in part on the change threshold value and the historical performance. For example, the option count ranges can be automatically calculated as discussed above with reference to 220 and 320.

At 550, a proposed option count is automatically determined for each product segment. Each proposed option count is limited to its corresponding option count range. The proposed option counts are automatically determined to maximize at least one performance indicator across the plurality of product segments for a new planning period. For example, the proposed option counts can be automatically calculated as discussed above with reference to 230 and 330.

At 560, the proposed option count for each product segment is displayed via the graphical user interface. Examples of displayed proposed option counts are depicted at 230 and 330.

In some implementations, sales targets are displayed in the graphical user interface. The sales targets depict (e.g., via graphical user interface elements) various constraints and/or targets that are calculated based on the proposed option counts for the new planning period. Example sales targets are depicted at 120.

Figure 6:
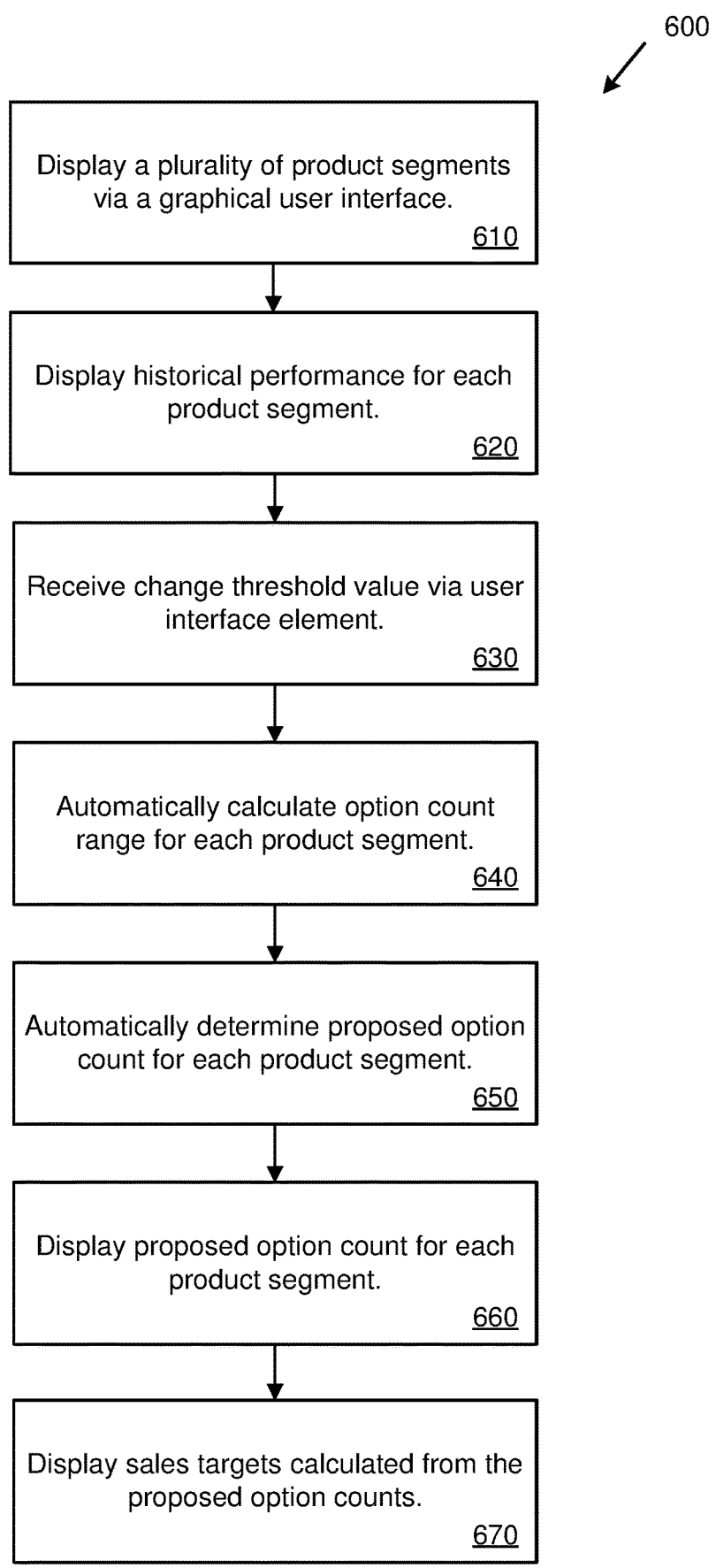
FIG. 6 is a flowchart of an example method for performing option planning using a graphical user interface, including displaying sales targets.

FIG. 6 is a flowchart of an example method 600 for performing option planning using a graphical user interface. The example method 600 can be performed by software running on one or more computing devices. For example, the example method 600 can be performed by an option planning application (e.g., running as a cloud service), such as the option planning application depicted in FIGS. 1-4.

At 610, a plurality of product segments are displayed to a user via a graphical user interface. In some implementations, the user first selects a product category from a plurality of available product categories. For example, the user can be presented with a plurality of product categories, such as tops (e.g., shirts) and bottoms (e.g., pants). The plurality of product segments are associated with the selected product category.

At 620, historical performance for each product is displayed via the graphical user interface. In some implementations, the historical performance is displayed as historical option counts. For example, a historical option count value can be displayed for each product segment indicating how many product options were provided for the product segment during a historical period (e.g., a previous month or year).

At 630, a change threshold value is received from a user via a user interface element of the graphical user interface. In some implementations, the change threshold value is received as a percentage value. However, the change threshold value can also be received using a different representation that can be used to calculate a variation to the historical performance, such as a fraction. In some implementations, the change threshold value is received via a slider graphical user interface element (e.g., via the change limit tool 120). However, the change threshold value can also be received using a different user interface element, such as an entry field, a selection from pre-defined values, etc.

At 640, an option count range is automatically calculated for each product segment based at least in part on the change threshold value and the historical performance. For example, the option count ranges can be automatically calculated as discussed above with reference to 220 and 320.

At 650, a proposed option count is automatically determined for each product segment. Each proposed option count is limited to its corresponding option count range. The proposed option counts are automatically determined to maximize at least one performance indicator across the plurality of product segments for a new planning period. For example, the proposed option counts can be automatically calculated as discussed above with reference to 230 and 330.

At 660, the proposed option count for each product segment is displayed via the graphical user interface. Examples of displayed proposed option counts are depicted at 230 and 330.

At 670, graphical representations of one or more sales targets are displayed. The sales targets are calculated from the proposed option counts. Examples of displayed sales targets are depicted at 120, 240, and 340.

In some implementations, the product segments are defined by attributes that are automatically identified as option defining attributes. For example, a user can select a category that is associated with a number of products, which are defined by product attributes. The user can also select a number of performance indicators. Based on the selections, the attributes that are most deterministic of the performance indicators can be identified using historical data and using information gain calculations. For example, the attributes can be ordered from most deterministic to least deterministic of one or more performance indicators (e.g., most deterministic of profit, revenue, etc.). The user can select one or more of the attributes (e.g., select the most deterministic attribute and the second most deterministic attribute) which will define the segments for performing option planning using a graphical user interface, such as graphical user interface 100 or 200. For example, the user could have selected the price band attribute and the product grade attribute from a list of attributes that were ordered from most deterministic to least deterministic of gross margin (e.g., the price band and product grade attributes could have been the most deterministic attributes of gross margin based on historical sales data for the selected category).

Computing Systems

Figure 7:
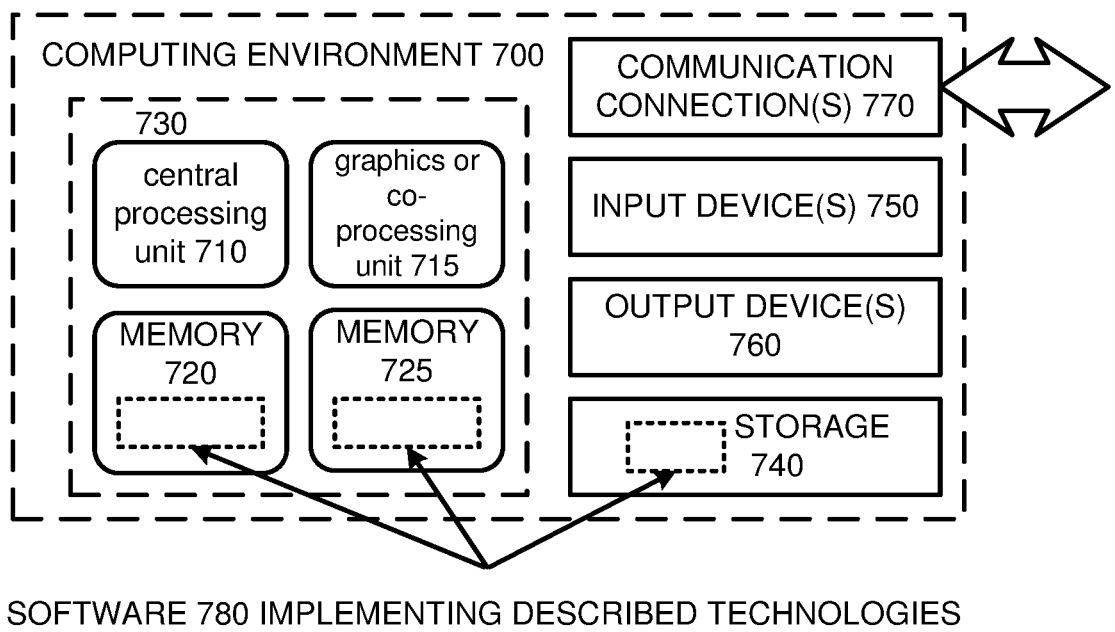
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
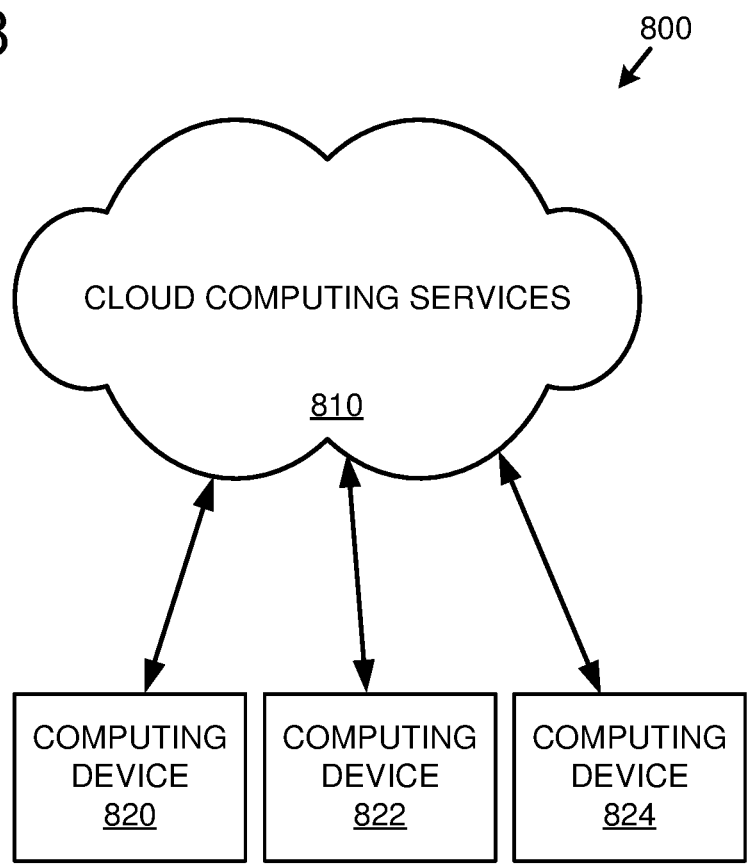
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device comprising one or more processing units and memory, the memory storing computer-executable instructions, for providing a more efficient graphical user interface when executed by the one or more processing units, the method comprising:

by the computing device:
displaying, to a user via a graphical user interface, a plurality of product segments;
displaying, to the user via the graphical user interface, historical performance for each of the plurality of product segments, wherein the historical performance indicates how many options were offered previously within each of the plurality of product segments;
receiving, from the user via a single graphical user interface element of the graphical user interface, a change threshold value, wherein the change threshold value is received from the user via a single selection of the single graphical user interface element of the graphical user interface;
responsive to receiving the change threshold value via the single selection of the single graphical user interface element of the graphical user interface:
automatically calculating an option count range for each product segment based at least in part on the change threshold value and the historical performance wherein the option count range for each product segment differs from its corresponding historical option count value, from a previous time period, according to the change threshold value;
automatically optimizing at least one performance indicator by automatically determining a proposed option count for each product segment, wherein each proposed option count is limited to its corresponding option count range, and wherein the proposed option counts are automatically determined to optimize the at least one performance indicator across the plurality of product segments for a new time period while adhering to one or more constraints;
displaying, via the graphical user interface, the proposed option count for each of the plurality of product segments; and
displaying, via the graphical user interface, the optimized at least one performance indicator.

2. The method of claim 1, wherein the product segments are organized into a plurality of clusters, wherein the clusters represent regions or groups of stores.

3. The method of claim 1, wherein automatically determining the proposed option counts for each product segment comprises applying a sales cost constraint.

4. The method of claim 1, wherein the proposed option counts for the plurality of product segments are automatically determined to maximize gross margin while staying within a sales cost constraint.

5. The method of claim 1, wherein the change threshold value is received via a single slider graphical user interface element.

6. The method of claim 1, wherein the change threshold value is indicated by a percentage value that represents a maximum amount that the proposed option counts can deviate from the historical performance.

7. The method of claim 1, wherein automatically calculating the option count range for each product segment comprises:
calculating an upper bound and a lower bound of option count values from a historical option count value for the segment.

8. The method of claim 1, further comprising:
displaying, to the user via the graphical user interface, graphical representations of one or more sales targets calculated from the proposed option counts.

9. The method of claim 1, further comprising:
receiving, from the user via the single graphical user interface element of the graphical user interface, a different change threshold value;
responsive to receiving the different change threshold value:
automatically calculating an updated option count range for each product segment based at least in part on the different change threshold value and the historical performance;
automatically optimizing the at least one performance indicator by automatically determining an updated proposed option count for each product segment, wherein each updated proposed option count is limited to its corresponding updated option count range, and wherein the updated proposed option counts are automatically determined to optimize the at least one performance indicator across the plurality of product segments for the new time period while adhering to the one or more constraints;
displaying, via the graphical user interface, the updated proposed option count for each of the plurality of product segments; and
displaying, via the graphical user interface, the optimized at least one performance indicator.

10. The method of claim 9, further comprising:
displaying, to the user via the graphical user interface, graphical representations of the one or more sales targets calculated from the updated proposed option counts.

11. The method of claim 1, wherein the proposed option counts for the plurality of product segments are automatically determined, at least in part, using a linear programming model.

12. One or more computing devices comprising:
one or more processors; and
memory;
the one or more computing devices configured, via computer-executable instructions, to perform operations, when the computer-executable instructions are executed by the one or more processors, for providing a more efficient graphical user interface, the operations comprising:

displaying, to a user via a graphical user interface, a plurality of product segments;

displaying, to the user via the graphical user interface, historical performance for each of the plurality of product segments, wherein the historical performance comprises historical option counts indicating how many options were offered previously within each of the plurality of product segments;

receiving, from the user via a single graphical user interface element of the graphical user interface, a change threshold value, wherein the change threshold value is received from the user via a single selection of the single graphical user interface element of the graphical user interface;

responsive to receiving the change threshold value via the single selection of the single graphical user interface element of the graphical user interface:

automatically calculating an option count range for each product segment based at least in part on the change threshold value and the historical performance, wherein the option count range for each product segment differs from its corresponding historical option count value, from a previous time period, according to the change threshold value;

automatically optimizing at least one performance indicator by automatically determining a proposed option count for each product segment, wherein each proposed option count is limited to its corresponding option count range, and wherein the proposed option counts are automatically determined to optimize the at least one performance indicator across the plurality of product segments for a new time period while adhering to one or more constraints;

displaying, via the graphical user interface, the proposed option count for each of the plurality of product segments; and displaying, to the user via the graphical user interface, graphical representations of one or more sales targets calculated from the proposed option counts.

13. The one or more computing devices of claim 12, wherein the product segments are organized into a plurality of clusters, wherein the clusters represent regions or groups of stores.

14. The one or more computing devices of claim 12, wherein the proposed option counts for the plurality of product segments are automatically determined to maximize gross margin while staying within a sales cost constraint.

15. The one or more computing devices of claim 12, wherein automatically calculating the option count range for each product segment comprises:

calculating an upper bound and a lower bound of option count values from a historical option count value for the segment.

16. The one or more computing devices of claim 12, the operations further comprising:

receiving, from the user via the single graphical user interface element of the graphical user interface, a different change threshold value;

responsive to receiving the different change threshold value:

automatically calculating an updated option count range for each product segment based at least in part on the different change threshold value and the historical performance;

automatically optimizing the at least one performance indicator by automatically determining an updated proposed option count for each product segment, wherein each updated proposed option count is limited to its corresponding updated option count range, and wherein the updated proposed option counts are automatically determined to optimize the at least one performance indicator across the plurality of product segments for the new time period while adhering to the one or more constraints;

displaying, via the graphical user interface, the updated proposed option count for each of the plurality of product segments; and displaying, to the user via the graphical user interface, graphical representations of the one or more sales targets calculated from the updated proposed option counts.

17. One or more computer-readable storage media storing computer-executable instructions for execution on one or more computing devices to perform operations for providing a more efficient graphical user interface, the operations comprising:

receiving, from a user via a graphical user interface, a selection of a product category from a plurality of available product categories;

displaying, to the user via the graphical user interface, a plurality of product segments associated with the selected product category;

displaying, to the user via the graphical user interface, historical performance for each of the plurality of product segments, wherein the historical performance indicates how many options were offered previously within each of the plurality of product segments;

receiving, from the user via a single graphical user interface element of the graphical user interface, a change threshold value, wherein the change threshold value is received from the user via a single selection of the single graphical user interface element of the graphical user interface;

responsive to receiving the change threshold value via the single selection of the single graphical user interface element of the graphical user interface:

automatically calculating an option count range for each product segment based at least in part on the change threshold value and the historical performance, wherein the option count range for each product segment differs from its corresponding historical option count value, from a previous time period, according to the change threshold value;

automatically optimizing at least one performance indicator by automatically determining a proposed option count for each product segment, wherein each proposed option count is limited to its corresponding option count range, and wherein the proposed option counts are automatically determined to optimize the at least one performance indicator across the plurality of product segments for a new time period while adhering to one or more constraints;

displaying, via the graphical user interface, the proposed option count for each of the plurality of product segments; and displaying, via the graphical user interface, the optimized at least one performance indicator.

18. The one or more computer-readable storage media of claim 17, wherein the product segments are organized into a plurality of clusters, wherein the clusters represent regions or groups of stores.

19. The one or more computer-readable storage media of claim 17, the operations further comprising:
further comprising:
receiving, from the user via the single graphical user interface element of the graphical user interface, a different change threshold value;
responsive to receiving the different change threshold value:
automatically calculating an updated option count range for each product segment based at least in part on the different change threshold value and the historical performance;
automatically optimizing the at least one performance indicator by automatically determining an updated proposed option count for each product segment, wherein each updated proposed option count is limited to its corresponding updated option count range, and wherein the updated proposed option counts are automatically determined to optimize the at least one performance indicator across the plurality of product segments for the new time period while adhering to the one or more constraints;
displaying, via the graphical user interface, the updated proposed option count for each of the plurality of product segments; and
displaying, via the graphical user interface, the optimized at least one performance indicator.

20. The one or more computer-readable storage media of claim 17, wherein each product segment is defined by one or more attributes, and wherein the one or more attributes are automatically identified as option defining attributes that are most deterministic of the at least one performance indicator.

\* \* \* \* \*